Figure 1:
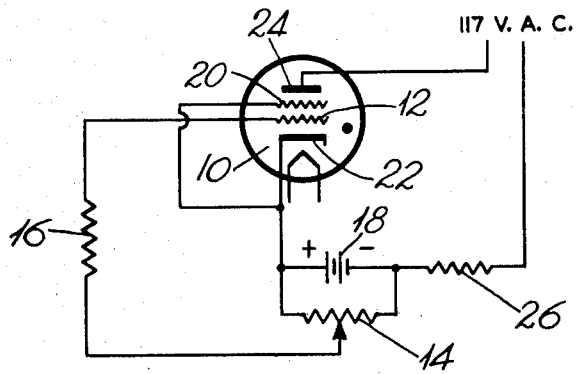

Jan. 5, 1965    P. A. MARSAL ETAL    3,164,764
CELL CHARGING DEVICE
Filed July 10, 1958

INVENTORS
PAUL A. MARSAL (DECEASED)
BY   JEANNETTE Y. MARSAL
EXECUTRIX
ANDREW TASCH

BY
ATTORNEY

United States Patent Office 3,164,764
Patented Jan. 5, 1965

3,164,764
CELL CHARGING DEVICE
Paul A. Marsal, deceased, late of Rocky River, Ohio, by Jeannette Y. Marsal, executrix, Rocky River, Ohio, and Andrew Tasch, Lakewood, Ohio, assignors to Union Carbide Corporation, a corporation of New York
Filed July 10, 1958, Ser. No. 747,703
9 Claims. (Cl. 320—53)

This invention relates to charging devices and to a cell charging process in which a substantially constant charging current is supplied to the cell under charge, which current is substantially independent of the voltage of the cell or of the variations in the line voltage of the alternating current source supplying the device.

Various battery chargers have been proposed in the art. These usually consisted of a transformer and rectifier operating from alternating current mains. These chargers required that the charging voltage supplied be sufficiently in excess of the nominal battery voltage that manual control was required to terminate the charging cycle. With wet type storage batteries venting to allow gas escape on overcharge was provided. However, modern hermetically sealed rechargeable batteries and "dry" rechargeable batteries have restricted means for prevention of abuse through overcharge. For these modern cells, it is particularly desirable that precise control be exercised over the charging means.

Many previous battery chargers, such as those used in charging lead acid storage cells, operate by providing a rectifier in series with the A.C. power main and the battery being charged. The power line voltage is usually decreased to approximately that of the fully charged battery by a transformer. This measure ensures that the charging rate will not become excessive, and that when the battery becomes fully charged, its voltage is approximately that of the transformer output so that charging stops. In practice, the charging current decreases from its maximum when the cell is fully discharged to essentially zero when the cell is fully recharged. The final voltage applied to the fully charged cell is usually allowed to be 30 to 50 percent greater than the average "plateau" of the normally discharging cell. In the special use of a rechargeable cell in electronics service, as in the power supply for a portable TV set which is intermittently recharged, these charging conditions may be deleterious to vacuum tube filaments or transistors. These are left connected to the battery during both charge and discharge of the cells and would be subjected to the large variations in supply voltage inherent in the aforementioned charging system.

In addition, many rechargeable cells will not accept high charging currents and are damaged thereby. In order to recharge such a cell to full capacity most economically a nearly constant current charging device is, therefore, desirable.

It is, therefore, an object of the present invention to provide a cell charging device which charges at a substantially constant current independent of variations in the supply main voltage or of the voltage of the cell to be charged.

Another object is to provide a charging device which operates with minimum excess in voltage applied to the cell under charge or other circuit components which may be left connected to the cell during the recharge cycle.

Figure 2:
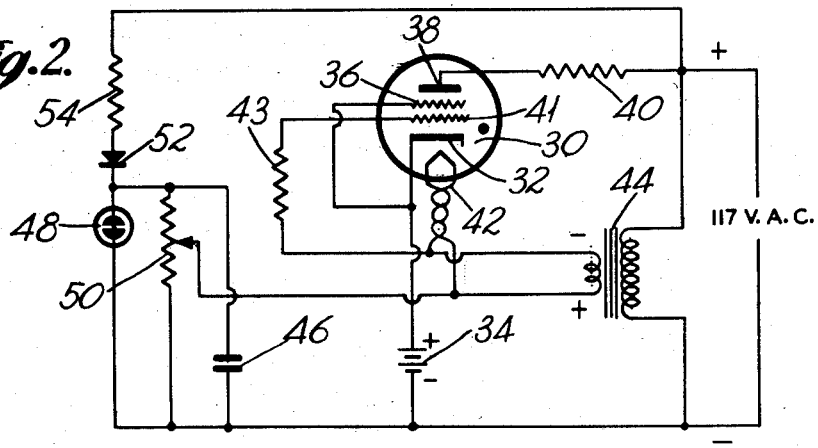
Figure 3:
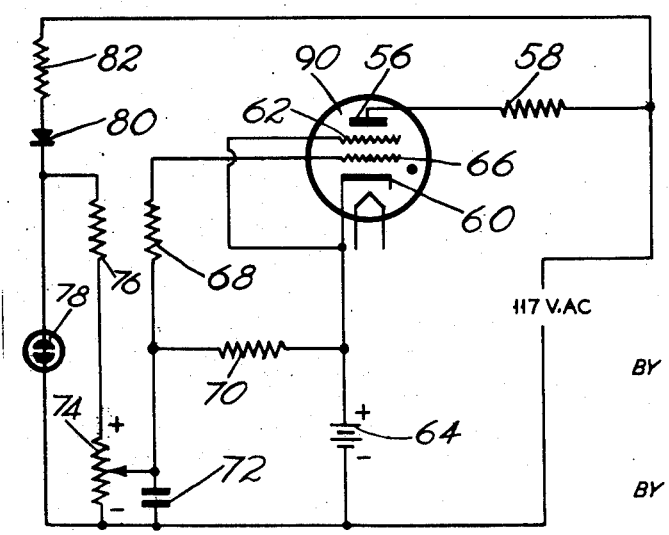

These and related objects, features and advantages of the present invention will be more readily apparent as the description thereof proceeds, especially when taken along with the accompanying drawing in which FIGS. 1, 2 and 3 are circuit diagrams of the charging device of the invention in its various embodiments.

In the practice of the invention, a current of substantially constant rate and having a minimum change in applied D.C. voltage is fed to the cell under charge from a device containing a Thyratron controlled by its grid potential. Means associated with the Thyratron are provided in the device of the invention to bias the grid thereof to cut off the plate current so as to stop the charging action of the device when the voltage of the cell under charge attains a predetermined value. Means are also provided for resuming the charging action when the voltage of the cell under charge falls below the predetermined value. Finally, means are provided in the device for adjusting the charging current to any desired predetermined value.

As is well known, Thyratrons are grid controlled rectifiers consisting of an electron emitting cathode and a plurality of electrodes in an envelope filled with low pressure gas. Since Thyratrons are grid controlled, it is possible to control initiation of conduction with very little power. In the present device, shield grid or four element Thyratrons having two grids are preferred, although others may be employed.

Referring now to FIG. 1, there is shown an illustrative embodiment of the invention comprising a Thyratron 10 of the shielded grid type. The Thyratron is controlled by means of grid potential supplied to its grid 12 through variable resistor 14, and fixed resistor 16 from the cell under charge 18. As shown, the shield grid 20 of the Thyratron is connected to its cathode 22. Anode 24 is connected to a power source, suitably a 117 volt 60 cycle source of A.C. current, which is also connected to the negative terminal of cell 18 through dropping resistor 26.

In the charger of the invention, as shown in FIG. 1, the potential of the control grid 12 of the Thyratron is derived from a variable resistor 14 connected in parallel with the cell under charge 18. Thus when the voltage of this cell reaches a predetermined negative value, it communicates a portion of the same to the control grid 12, making the grid voltage sufficiently negative, thereby biasing the Thyratron to cut off and stopping its rectifying action, so that no additional charge is imparted to cell 18. If the cell voltage later decreases below the predetermined value the grid becomes less negative, so that rectifying and charging action by the Thyratron resume at the same rate as before until the predetermined voltage value is reached. At this point the charging action again stops.

The preferred embodiment of the invention shown in FIG. 2 is particularly designed for the recharging of 12 volt batteries. As shown, this device comprises suitably a type 2050 Thyratron 30 having its cathode 32 connected to the postive terminal of the battery to be charged 34, and to its shield grid 36. The Thydratron plate 38 is connected to a source of 117 volts A.C. current through dropping resistor 40 of approximately 600 ohms, which limits the average charging current to about 0.2 ampere. Grid 41 is connected to the negatively phased secondary coil of filament transformer 44 through 50,000 ohms resistor 43. The filament 42 of the Thyratron is connected also to the same coil of filament transformer 44. The other secondary terminal of this transformer (shown as having a positive phase in the drawing) connects with the reference voltage supply through the variable tap of resistor 50 A condenser 46 of approximately 10 microfarads is also connected to the negative terminal of battery 34 and the positive terminal of the reference neon tube 48. This condenser serves to remove "ripples" from the reference voltage. It will be seen then that the filament transformer is connected in series with the reference voltage from the neon tube regulated source. This neon tube regulated source merely supplies a constant direct current potential to Thyratron control grid 41 and is comprised of a neon tube 48 which is connected to the negative terminal of battery 34 and in series with a rectifier 52 and a resistor 54. The other terminal of resistor 54 is connected to the power main. Tapped resistor 50 is connected in parallel with neon tube 48 and condenser 46 and provides an adjustable filtered direct current reference voltage for Thyratron control grid 41.

In the embodiment described above, the filament transformer is phased as indicated in order to put a compensating A.C. component on the grid of the Thyratron, which component is 180° out of phase with its plate voltage. This component serves to sharpen the control characteristic of the charging circuit so that with the arrangement shown, line voltage changes between 105 and 125 volts have been found to influence the voltage to which a 12 volt battery is charged by only 0.6 volt. Thus, the variation in charging voltage is approximately 5 percent as compared with 30 to 50 percent for previously available chargers and the charging current is substantially constant until the battery voltage returns to the predetermined value.

FIG. 3 illustrates a further embodiment of the invention having adjustable means for regulating the voltage of the battery under charge. The device comprises a Thyratron tube 90, the plate 56 of which is connected to a 60 cycle 117 volts A.C. source through a dropping resistor 58. The tube cathode 60 and its shield grid 62 are connected together, and the former is connected to the positive terminal of the battery under charge 64. The control grid 66 is connected to the same battery terminal through 50,000 ohms resistor 68 and 100,000 ohms resistor 70, as well as to one plate of electrolytic condenser 72 of 10 microfarad and to 80,000 ohms potentiometer 74, which together with 680,000 ohms resistor 76 is connected in parallel across neon tube 78, but in series with 117 volts selenium rectifier 80. Completing the circuit, rectifier 80 connects with the A.C. voltage source through resistor 82 of 100,000 ohms. Neon tube 78 has its second terminal connected to the negative terminal of battery 64 and the second terminal of condenser 72.

The above charger maintains substantially constant charging current through the battery under charge until the battery voltage attains a value adjustable by means of potentiometer 74 at which the negative bias on the Thyratron control grid prevents further ionization therein. At this point, the charging action stops and will not resume until the voltage of the battery under charge drops to a lower value.

What is claimed is:

1. A battery charger capable of charging a battery from a fully discharged to a fully charged condition at a substantially constant current and at a voltage that varies from the voltage of the discharged battery to that of the battery when fully charged, which battery charger comprises, in combination, a rectifier having an anode, a cathode and means for controlling the flow of current between said anode and said cathode; an A.C. current source connected across said anode and said cathode of said rectifier and in series with the battery to be charged, said battery being connected in series with the said rectifier; a current limiting resistor connected in series between said A.C. current source and said rectifier, said resistor being of a value such that the current fed from said rectifier to said battery to be charged is substantially constant and below that at which the elements of said battery may be damaged; and voltage regulating means connected across said A.C. current source and including a reference voltage device in series with said battery to be charged and means connected across said reference voltage device and in series with said means for controlling the flow of current through said rectifier whereby said rectifier is biased to conduct said current to said battery to be charged when the voltage of said battery is below a predetermined voltage and to cut off said current to said battery when the voltage of said battery is above said predetermined voltage.

2. A battery charger capable of charging a battery from a fully discharged to a fully charged condition at a substantially constant current and at a voltage that varies from the voltage of the discharged battery to that of the battery when fully charged, which battery charger comprises, in combination, a grid-controlled rectifier having an anode, a cathode and a grid; an A.C. current source connected across said anode and said cathode of said rectifier and in series with the battery to be charged, said battery being connected in series with said cathode of said rectifier; a current limiting resistor connected in series between said A.C. current source and said anode of said rectifier, said resistor being of a value such that the current fed from said rectifier to said battery to be charged is substantially constant and below that at which the elements of said battery may be damaged; voltage regulating means connected across said A.C. current source and including a reference voltage device in series with said battery to be charged, D.C. voltage means connected in series between said reference voltage device and said A.C. current source whereby a direct current voltage is supplied to said reference voltage device, variable resistor means connected across said reference voltage device and transformer means connected across said A.C. current source and having the secondary terminals thereof connected between said grid and said variable resistor means whereby at least a portion of the voltage of said reference voltage device is fed to said grid of said rectifier and whereby said rectifier is biased to conduct said current to said battery to be charged when the voltage of said battery is below a predetermined voltage and to cut off said current to said battery when the voltage of said battery is above said predetermined voltage.

3. The battery charger of claim 2 wherein said reference voltage device is a neon tube.

4. The battery charger of claim 2 wherein said grid-controlled rectifier is a thyratron.

5. The battery charger of claim 2 wherin said means for providing a D.C. voltage to said voltage reference device comprises a diode rectifier in series with a current limiting resistor.

6. A battery charger capable of charging a battery from a fully discharged to a fully charged condition at a substantially constant current and at a voltage that varies from the voltage of the discharged battery to that of the battery when fully charged, which battery charger comprises, in combination, a grid-controlled rectifier having an anode, a cathode and a grid; an A.C. current source connected across said anode and said cathode of said rectifier and in series with the battery to be charged, said battery being connected in series with said cathode of said rectifier; a current limiting resistor connected in series between said A.C. current source and said anode of said rectifier, said resistor being of a value such that the current fed from said rectifier to the battery to be charged is substantially constant and below that at which the elements of said battery may be damaged; voltage regulating means connected across said A.C. current source and including a reference voltage device in series with said battery to be charged, D.C. voltage means connected in series between said reference voltage device and said A.C. current source whereby a direct current voltage is supplied to said reference voltage device, a variable resistance means connected across said reference voltage device, first resistance means connected between said grid of said rectifier and said variable resistance means and second resistance means connected between said first resistance means and said variable resistance means and connected in series with said cathode of said rectifier whereby at least a portion of the voltage of said reference voltage device is fed to said grid of said rectifier and whereby said rectifier is biased to conduct said current to the battery to be charged when the voltage of said battery is below a predetermined voltage and to cut off said current to said battery when the voltage of said battery is above said predetermined voltage.

7. The battery charger of claim 6 wherein said reference voltage device is a neon tube.

8. The battery charger of claim 6 wherein said grid-controlled rectifier is a thyratron.

9. The battery charger of claim 6 wherein said means for providing a D.C. voltage to said voltage reference device comprises a diode rectifier in series with a current limiting resistor.

References Cited in the file of this patent

UNITED STATES PATENTS

| 1,802,483 | Siragusa | Apr. 28, 1931 |
| 2,066,603 | Beetem | Jan. 5, 1937 |
| 2,270,894 | Overbeck | Jan. 27, 1942 |
| 2,489,858 | Burnett | Nov. 29, 1949 |